United States Patent
Cooper

(10) Patent No.: US 7,851,034 B2
(45) Date of Patent: Dec. 14, 2010

(54) EMBEDDED VACUUM INSULATING GLASS UNIT, AND/OR METHOD OF MAKING THE SAME

(75) Inventor: David J. Cooper, Canton, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 272 days.

(21) Appl. No.: 11/987,663

(22) Filed: Dec. 3, 2007

(65) Prior Publication Data

US 2009/0142521 A1    Jun. 4, 2009

(51) Int. Cl.
*E06B 3/00* (2006.01)
*E04C 2/54* (2006.01)

(52) U.S. Cl. .................. 428/34; 428/212; 52/204.5; 52/786.1; 52/786.11; 52/786.13

(58) Field of Classification Search .................. 428/34, 428/212; 52/203, 204, 204.5, 786.1, 786.11, 52/786.13
See application file for complete search history.

(56) References Cited

U.S. PATENT DOCUMENTS

| | | | |
|---|---|---|---|
| 3,837,129 | A | 9/1974 | Losell |
| 6,071,575 | A | 6/2000 | Collins et al. |
| 6,103,324 | A | 8/2000 | Collins et al. |
| 6,105,336 | A | 8/2000 | Katoh et al. |
| 6,352,749 | B1 | 3/2002 | Aggas |
| 6,383,580 | B1 | 5/2002 | Aggas |
| 6,420,002 | B1 | 7/2002 | Aggas et al. |
| 6,444,281 | B1 | 9/2002 | Wang et al. |
| 6,506,272 | B1 | 1/2003 | Aggas |
| 6,541,083 | B1 | 4/2003 | Landa et al. |
| 6,541,084 | B2 | 4/2003 | Wang |
| 6,635,321 | B2 | 10/2003 | Wang et al. |
| 6,641,689 | B1 | 11/2003 | Aggas |
| 6,692,600 | B2 | 2/2004 | Veerasamy et al. |

(Continued)

FOREIGN PATENT DOCUMENTS

EP         1 225 297        7/2002

(Continued)

OTHER PUBLICATIONS

International Search Report dated Feb. 4, 2009.

*Primary Examiner*—Donald Loney
(74) *Attorney, Agent, or Firm*—Nixon & Vanderhye P.C.

(57) ABSTRACT

Certain example embodiments of this invention relate to a vacuum insulating glass (VIG) unit surrounded by two glass substrates, with at least one spacer element being disposed adjacent to and/or cradling the VIG and with a sealant sealing the entire unit at each end of the VIG, thereby reducing the chances of the VIG being damaged and/or improving the insulating features of the entire window unit. In certain example embodiments the spacer may be substantially U-shaped, whereas two pillar-like spacers may be used in connection with certain other example embodiments. The spacer element(s) may be butyl-based, foam-based, warm-edge spacer element(s), etc. The sealant may be polysulfide based, one- or two-part silicone based, polyurethane based, a dual seal equivalent sealant product, a hot melt butyl based sealant product, etc. The R-value of the window unit may be at least about 11, but typically is about 15-16, when measured at the center of the lite.

22 Claims, 3 Drawing Sheets

U.S. PATENT DOCUMENTS

| | | |
|---|---|---|
| 6,701,749 B2 | 3/2004 | Wang et al. |
| 6,946,171 B1 | 9/2005 | Aggas |
| 6,955,026 B2 * | 10/2005 | Misonou .................. 52/786.13 |
| 6,966,208 B1 | 11/2005 | Collins |
| 2007/0103763 A1 | 5/2007 | Poll et al. |

FOREIGN PATENT DOCUMENTS

| | | |
|---|---|---|
| WO | WO 94/24398 | 10/1994 |

* cited by examiner

EMBEDDED VACUUM INSULATING GLASS UNIT, AND/OR METHOD OF MAKING THE SAME

FIELD OF THE INVENTION

Certain example embodiments of this invention relate to a vacuum insulating glass (VIG) unit that is embedded in an insulating glass (IG) window unit, and/or a method of making the same. More particularly, certain example embodiments relate to a VIG unit surrounded by two glass substrates, with at least one spacer element being disposed adjacent to and/or cradling the VIG and with a sealant sealing the entire unit at each end of the VIG so as to reduce the chances of the VIG being damaged and/or to improve the insulating features of the entire window unit. In certain example embodiments the spacer may be substantially U-shaped, whereas two pillar-like spacers may be used in connection with certain other example embodiments. The at least one spacer element may be a butyl-based spacer element, a foam-based spacer element, a warm-edge spacer element, etc., in certain example embodiments. In certain example embodiments, the sealant may be a polysulfide based sealant, a one- or two-part silicone based sealant, a polyurethane based sealant, a dual seal equivalent sealant product, a hot melt butyl based sealant product, etc. The R-value of the window unit may be at least about 11, but typically is about 15-16, when measured at the center of the lite.

BACKGROUND AND SUMMARY OF EXAMPLE EMBODIMENTS OF THE INVENTION

Vacuum insulating glass (VIG or vacuum IG) units are known in the art. FIG. 1 is a conventional vacuum IG unit 100. VIG unit 100 includes two spaced apart glass substrates 102 and 104, which enclose an evacuated or low pressure space 110 therebetween. Glass sheets/substrates 102 and 104 are interconnected by peripheral or edge seal of fused solder glass 108 and an array of support pillars or spacers 106.

A pump-out tube is hermetically sealed by solder glass to an aperture or hole, which passes from an interior surface of glass sheet 102 to the bottom of recess 114 in the exterior face of sheet 104. A vacuum is attached to pump-out tube so that the interior cavity between substrates 102 and 104 can be evacuated to create a low pressure area or space 110. After evacuation, the tube is melted to seal the vacuum, forming cover 112. The recess 114 retains the sealed tube. Optionally, a chemical getter may be included within the recess 114.

Unfortunately, vacuum insulating glass units tend to be fragile. For example, they are susceptible to damage from shocks and/or strikes. This may lead to breakage of one or both of the substrates, at least partial separation of the solder 108, degradations in the insulating performance of the unit as a whole, and/or the like. Vibrations also may adversely affect the VIG unit. Although conventional insulating glass units tend to be more robust as compared to VIG units, such conventional IG units generally do not provide the same high levels of insulating features of VIG units.

Thus, it will be appreciated that there is a need in the art for vacuum insulating glass units having increased resiliency and/or improved insulating features.

In certain example embodiments of this invention, a window unit is provided. Four substantially parallel spaced-apart glass substrates are arranged so as to form a center gap between the two inner substrates and first and second outer gaps respectively between each of the two inner substrates and the two outer substrates. At least one spacer element is provided proximate to each end of a major axis of the window unit so as to maintain the four substrates in substantially parallel-apart relation to one another. A sealant is provided at least adjacent to the at least one spacer element at each end of the major axis of the window unit so as to at least partially seal the window unit. The center gap between the two inner substrates is provided at an inner gap pressure, the inner gap pressure being a pressure below atmospheric. The first and second outer gaps are provided at pressures greater than the inner gap pressure. The window unit has an R-value of at least about 11 measured at a center thereof.

In certain example embodiments, a window unit is provided. A vacuum insulating glass unit is provided. First and second glass substrates are located on opposing sides of the vacuum insulating glass unit so as to form first and second outer gaps between the first substrate and the vacuum insulating glass unit and between the vacuum insulating glass unit and the second substrate, respectively. At least one spacer element is provided proximate to each end of the vacuum insulating glass unit so as to maintain the first and second glass substrates and the vacuum insulating glass unit in substantially parallel-apart relation to one another. A sealant is provided at least adjacent to the at least one spacer element at each end of the major axis of the vacuum insulating glass unit so as to at least partially seal the window unit. The vacuum insulating glass unit includes an inner air gap at an inner gap pressure, the inner gap pressure being a pressure below atmospheric. The first and second outer gaps are provided at pressures greater than the inner gap pressure. The window unit has an R-value of at least about 11 measured at a center thereof.

In certain example embodiments, a method of making a window unit is provided. Four substantially parallel spaced-apart glass substrates are provided so as to form a center gap between the two inner substrates and first and second outer gaps respectively between each of the two inner substrates and the two outer substrates. At least one spacer element is provided proximate to each end of a major axis of the window unit so as to maintain the four substrates in substantially parallel-apart relation to one another. A sealant is provided at least adjacent to the at least one spacer element at each end of the major axis of the window unit so as to at least partially seal the window unit. The center gap between the two inner substrates is provided at an inner gap pressure, the inner gap pressure being a pressure below atmospheric. The first and second outer gaps are provided at pressures greater than the inner gap pressure. The window unit has an R-value of at least about 11 measured at a center thereof.

In certain non-limiting implementations, the spacer may be substantially U-shaped, whereas two pillar-like spacers may be used in connection with certain other non-limiting implementations. The at least one spacer element may be a butyl-based spacer element, a foam-based spacer element, a warm-edge spacer element, etc., in certain non-limiting implementations. In certain non-limiting implementations, the sealant may be a polysulfide based sealant, a one- or two-part silicone based sealant, a polyurethane based sealant, a dual seal equivalent sealant product, a hot melt butyl based sealant product, etc.

The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

In certain example embodiments of this invention, a window unit is provided. Four substantially parallel spaced-apart glass substrates are arranged so as to form a center gap between the two inner substrates and first and second outer gaps respectively between each of the two inner substrates and the two outer substrates. At least one spacer element is provided proximate to each end of a major axis of the window unit so as to maintain the four substrates in substantially parallel-apart relation to one another. A sealant is provided at least adjacent to the at least one spacer element at each end of the major axis of the window unit so as to at least partially seal the window unit. The center gap between the two inner substrates is provided at an inner gap pressure, the inner gap pressure being a pressure below atmospheric. The first and second outer gaps are provided at pressures greater than the inner gap pressure. The window unit has an R-value of at least about 11 measured at a center thereof. In certain example embodiments the spacer may be substantially U-shaped, whereas two pillar-like spacers may be used in connection with certain other example embodiments. The spacer element(s) may be butyl-based, foam-based, warm-edge spacer element(s), etc. The sealant may be polysulfide based, one- or two-part silicone based, polyurethane based, a dual seal equivalent sealant product, a hot melt butyl based sealant product, etc. The R-value of the window unit may be at least about 11, but typically is about 15-16, when measured at the center of the lite.

Figure 1:
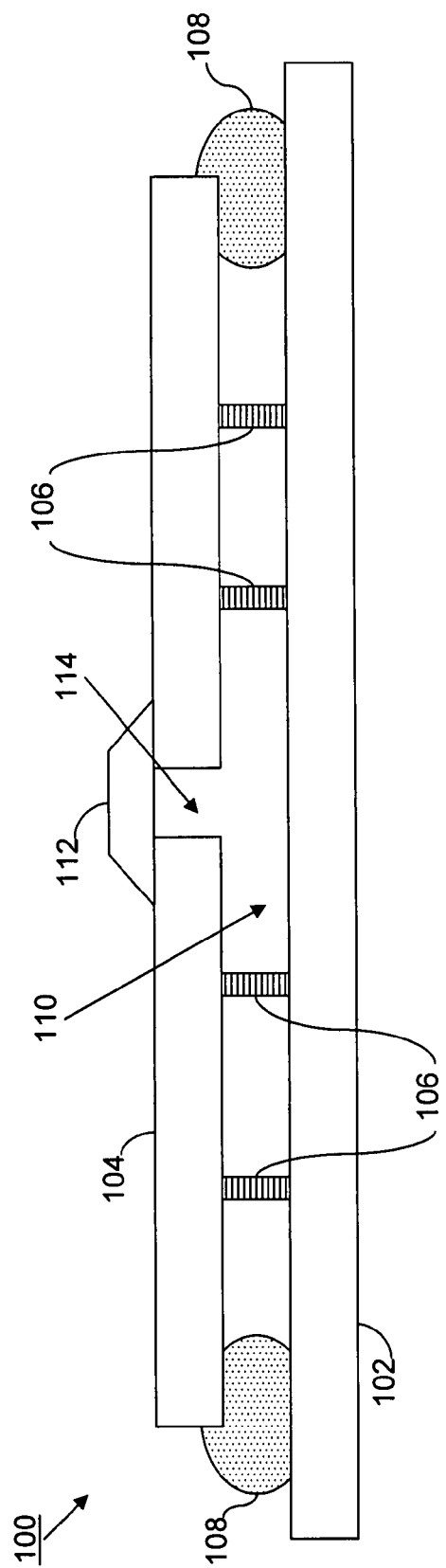
FIG. 1 is a cross-sectional view of a conventional vacuum IG unit.
Figure 2:
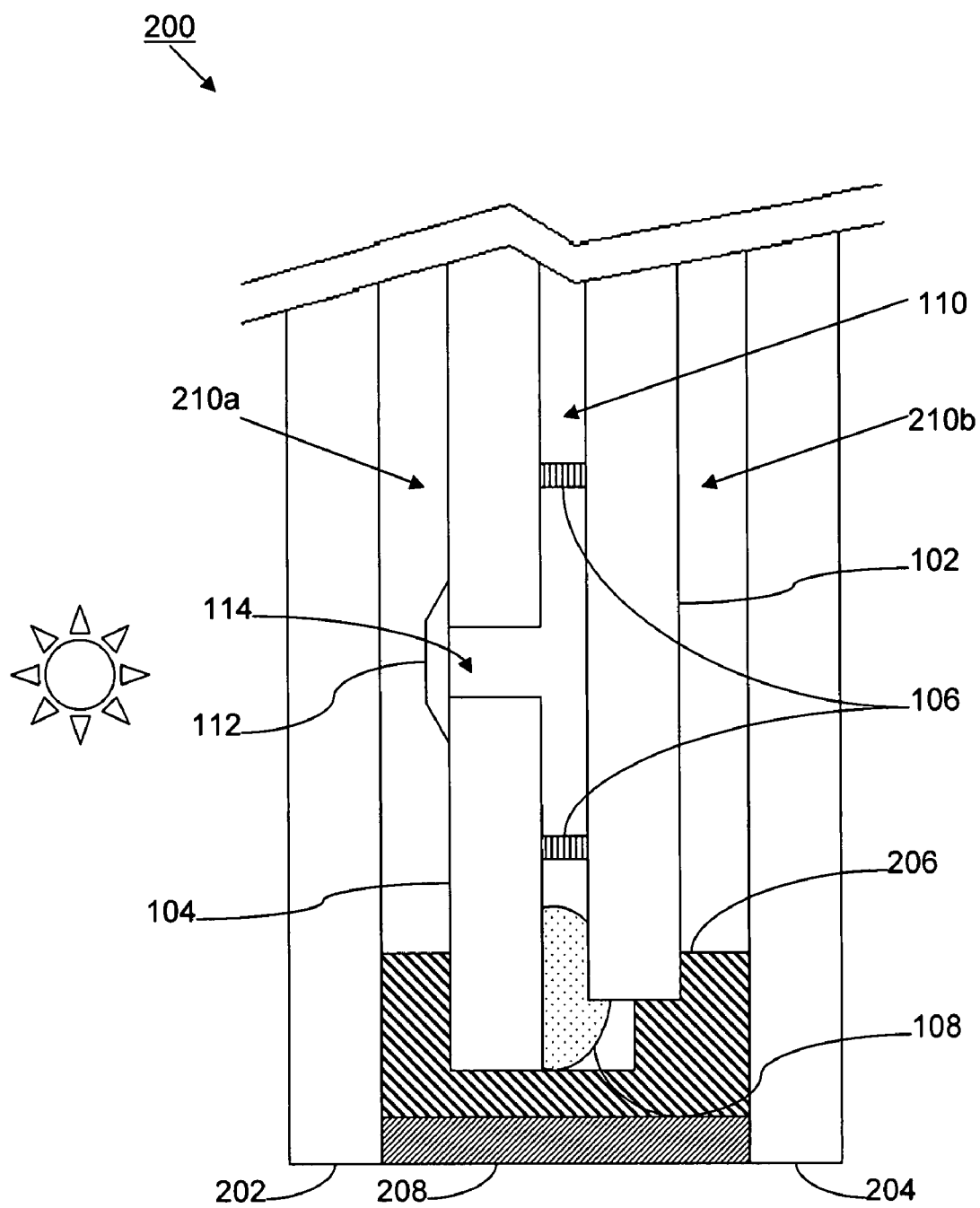
FIG. 2 is a cross-sectional view of an embedded vacuum IG unit in accordance with an example embodiment.
Figure 3:
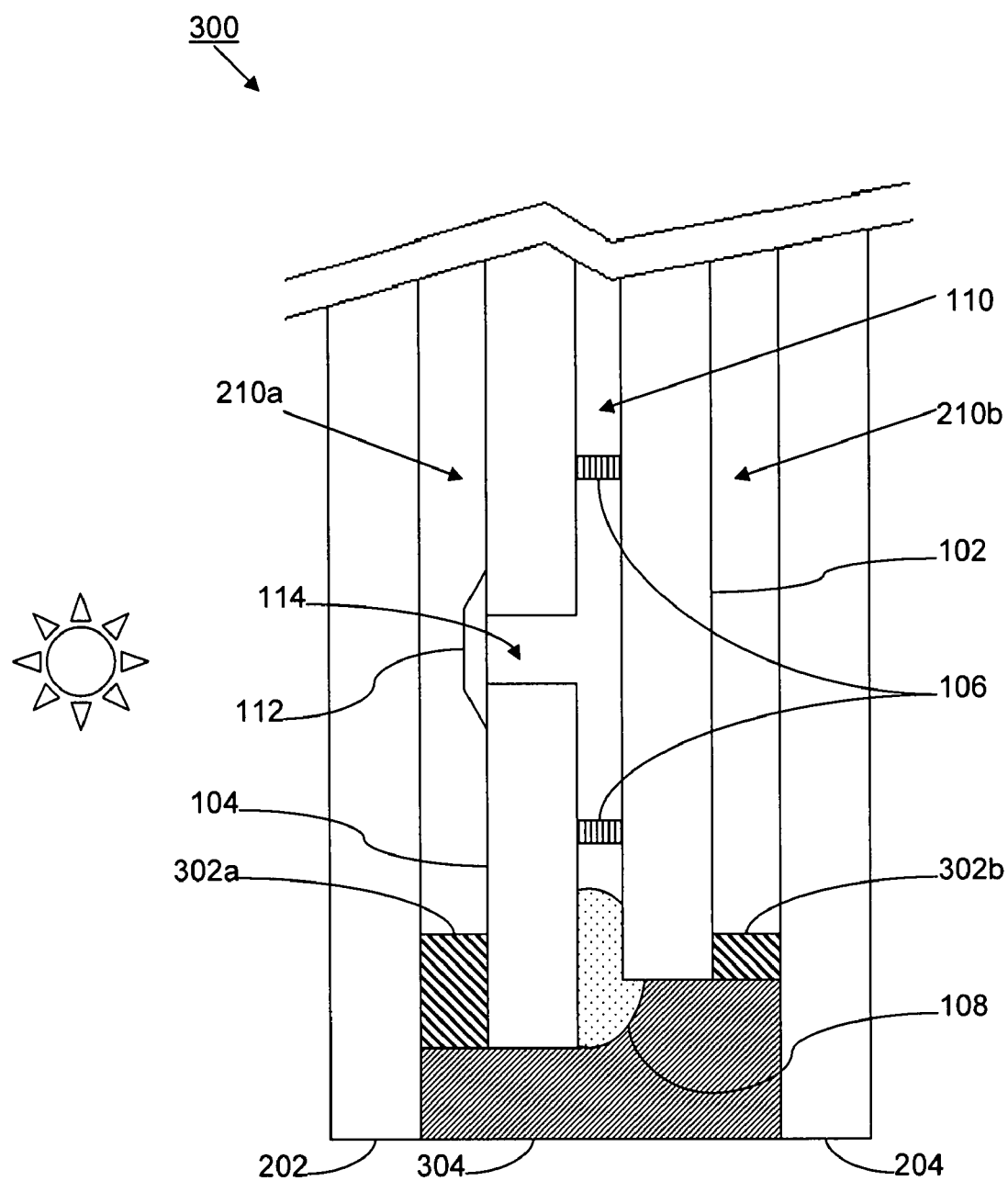
FIG. 3 is a cross-sectional view of another embedded vacuum IG unit in accordance with an example embodiment.

Referring now more particularly to the drawings, FIG. 2 is a cross-sectional view of an embedded vacuum IG unit 200 in accordance with an example embodiment, and FIG. 3 is a cross-sectional view of another embedded vacuum IG unit 300 in accordance with an example embodiment. In both the embedded vacuum IG unit 200 of FIG. 2 and the embedded vacuum IG unit 300 of FIG. 3, a vacuum IG unit is constructed according to conventional techniques. Thus, parallel spaced apart glass sheets/substrates 102 and 104 are interconnected by peripheral or edge seal of fused solder glass 108 and an array of support pillars or spacers 106 so as to define a parallel gap 110 between the first and second substrates 102 and 104. As is known, the air is evacuated from the gap 110 to a pressure less than atmospheric, and the recess 114 in the substrate 104 used to evacuate the air in the gap 110 is sealed via cap 112. More particularly, the pressure in the low-pressure area 110 preferably is at a level below about $10^{-2}$ Torr, more preferably below about 1.0 mTorr, or $10^{-3}$ Torr, and most preferably below about $10^{-6}$ Torr.

In both FIGS. 2 and 3, the vacuum insulating glass unit is mounted within conventional glazing products, providing a substantially enhanced R-value (discussed in greater detail below), while also protecting of the vacuum insulating glass unit from breakage and/or damage. The VIG unit is housed within a insulating glass (IG) unit comprising outer and inner sheets/substrates 202 and 204. Additionally, the VIG unit is cradled or held in place and thus better protected from shock and/or strike damage while inside the IG cavity (e.g., the area defined between the outer and inner substrates 202 and 204), thereby reducing the chance of breakage and/or damage to the VIG unit itself.

Two additional outer parallel gaps 210a and 210b are defined, between surfaces 2 and 3 and between surfaces 6 and 7 of the embedded VIG units 200 and 300, respectively. The inner gap 110 of the VIG unit itself is at a pressure less than atmospheric, and also may be at a pressure less than the two additional outer parallel gaps 210a and 210b.

The embedded VIG is held in place with one or more spacer elements and/or using IG sealants. Thus, the VIG unit is protected from vibration, strike, and/or shock damage by being substantially physically isolated within the broader IG unit (defined by the outer and inner substrates 202 and 204) via the resilient peripheral edge spacer-sealant system of the IG unit as a whole. FIGS. 2 and 3 illustrate two example arrangements for providing such physical isolation and resilient peripheral edge spacer-sealant systems. It will be appreciated that although FIGS. 2 and 3 show only one-half of a window unit of certain example embodiments, the same or similar techniques may be applied to the other half of the window unit. For example, a bottom half of the assembled window unit may be constructed in accordance with the example embodiment shown in FIG. 2 while a top half of the assembled window unit may be constructed in accordance with the example embodiment shown in FIG. 3, or vice versa.

In the arrangement shown in FIG. 2, the embedded VIG is cradled in a substantially U-shaped peripheral spacer element 206. The substantially U-shaped peripheral spacer element 206 may be, for example, a foam-based spacer (e.g., of the type commercially available from Edgetech), a rubberized spacer such as a butyl-based spacer element (e.g., of the type commercially available from Truseal), and/or the like.

The substantially U-shaped peripheral spacer element 206 may be bonded to one or more surfaces, e.g., via an adhesive, tape, hot-melt butyl, and/or the like. In such a case, an adhesive may be applied to or around one or both of the outer edges of the legs of the spacer element 206 such that the adhesive bonds one or both of these legs to surfaces 2 (the inner surface of the outer substrate 202) and/or 7 (the inner surface of the inner substrate 204). Alternatively, or in addition, an adhesive may be applied to or around one or both of the inner edges of the legs of the spacer element 206 such that the adhesive bonds one or both of these legs to surfaces 3 (the outer surface of the substrate 102) and/or 6 (the outer surface of the substrate 104). Similarly, an adhesive may also be applied inside the channel of the spacer element 206 so as to form a connection to the ends of one or both substrates 102 and 104. In general, commercially available spacer elements (including those identified above) often are packaged with adhesives suitable for use with certain example embodiments.

In certain example embodiments, the substantially U-shaped peripheral spacer element 206 may simply fit around the end portions of the embedded VIG unit, cradling it without the use of an adhesive. In such a case, the VIG unit and even the spacer element 206 itself may be said to "float" between the substrates 102 and 104, as there is no adhesive provided.

In certain example embodiments, the substrates 102 and 104 of the VIG unit will be substantially the same length. However, in certain example embodiments, the substrates 102 and 104 may be differently sized and/or not flush with each other and/or the solder 108, leaving a small gap or void at or near the end of the embedded VIG unit. Thus, in certain example embodiments, the spacer element 206 may be at least partially deformable and/or at least initially provided or shaped to accommodate the slightly irregular (e.g., not perfectly U-shaped) configuration. For example, a spacer may at least partially deform (e.g., to an appropriate size and/or shape) under the weight of the VIG unit and/or may have a notched-out portion to accommodate the shape of the VIG unit.

Thus, in certain example embodiments, a spacer element is substantially U-shaped so as to at least partially cradle the two inner substrates between upward extending arms of the substantially U-shaped spacer element, the two outer substrates being on opposing sides of the upward extending arms of the substantially U-shaped spacer element from the two inner substrates. Moreover, certain example embodiments may further comprise an adhesive to adhere the substantially U-shaped spacer element to one or both of the two inner substrates, and/or one or both of the two outer substrates, via the upward extending arms thereof.

By contrast, in the arrangement shown in FIG. 3, the embedded VIG unit is separated from the two substrates 202 and 204 by two peripheral pillar-like spacer elements 302a and 302b. The pillar-like spacer elements 302a and 302b may be formed from a variety of materials. For example, they may be foam spacer elements (e.g., of the type commercially available from Edgetech); rubber spacers such as a butyl-based spacer system (e.g., a Swiggle spacer system available from Truseal); and/or warm edge spacer systems of or including plastic (e.g., of the type commercially available from Inex), stainless steel, combination plastic, extruded thermoplastic spacers (e.g., TPS, which is commercially available from Bistronic), etc. It will be appreciated that as used herein, the term "warm edge" connotes a spacer that generally is not a standard aluminum spacer, as such standard aluminum spacers tend to provide poor insulating features. By contrast, "warm edge" as used herein connotes a material having low conductivity (e.g., low thermal conductance) and/or includes a thermal break in the spacer assembly.

Similar to above, the pillar-like spacer elements 302a and 302b may be adhered to one or more surfaces of the unit as a whole. For example, spacer 302a may be bonded to surfaces 2 and/or 3 (e.g., the inner surface of the outer substrate 202 and the outer surface of the substrate 104, respectively). Similarly, spacer 302b may be bonded to surfaces 6 and/or 7 (e.g., the outer surface of the substrate 102 and the inner surface of the outer substrate 204, respectively). Also, similar to the above, any adhesive, tape, hot-melt butyl, and/or other suitable adhering or bonding agent may be used in connection with certain example embodiments. Furthermore, as noted above, commercially available spacer elements (including those identified above) often are packaged with adhesives suitable for use with certain example embodiments.

Thus, in certain example embodiments two pillar-shaped spacer elements may be respectively provided between each inner substrate and the adjacent outer substrate proximate to each end of the major axis of the window unit so as to maintain the four substrates in substantially parallel-apart relation to one another. Furthermore, certain example embodiments may further comprise an adhesive to adhere the pillar-shaped spacer elements to one or both of the two inner substrates, and/or one or both of the two outer substrates.

Also as noted above, in certain example embodiments, the substrates 102 and 104 may be differently sized and/or not flush with each other and/or the solder 108, leaving a small gap or void at or near the end of the embedded VIG unit. Thus, in certain example embodiments, and as shown in FIG. 3, the spacers 302a and 302b may be provided at differing sizes, for example, so as to have one end thereof substantially flush with the respective bottoms of the adjacent VIG unit substrate 104 and 102 and extend to substantially the same vertical position.

Of course, it will be appreciated that the present invention is not limited to this configuration. For example, in certain other example embodiments, the spacers 302a and 302b may be similarly sized and any gaps or voids may be filled by a suitable sealant (described in greater detail below).

The embodiments shown in and described in connection with FIGS. 2 and 3 are sealed with a sealant. The sealant may be structural or non-structural. The sealants may be one or more of a polysulfide (e.g., commercially available from Fenzi), a one- or two-part silicone (e.g., commercially available from Dow), a polyurethane (e.g., commercially available from Bostik), a dual seal equivalent (DSE) product (e.g., commercially available from H.B. Fuller), a hot melt butyl based product (e.g., commercially available from H.B. Fuller), etc. In certain example embodiments, a sealant (e.g., a DSE or other warm-applied curable butyl-based sealant) may be chosen in dependence on its resistance to re-melting after curing.

In FIG. 2, the sealant 208 is applied adjacent to the spacer 206 so that it is substantially flush with the substrates 202 and 204. In FIG. 3, the sealant 304 also is substantially flush with the substrates 202 and 204 and is adjacent to the spacers 302a and 302b. However, in FIG. 3, the sealant also contacts the edges of the VIG unit substrates 102 and 104, as well as the VIG unit solder 108.

As noted above, when a vacuum insulating glass unit is mounted within conventional glazing products, it is possible to provide a substantially enhanced R-value. R-value is a term predominantly used in the building industry to rate the insulative properties of construction materials and building assemblies. The higher the R-value, the greater insulation value. An R-value is derived from a U-factor, which describes how well a building material conducts heat. More particularly, R is the inverse of U. Methodologically, the U-factor measures the heat transfer of a material of known thickness over a given area under standard conditions. The usual standard for U-factors is at a temperature gradient of 24° C. at 50% humidity in no wind conditions. The R-values described herein have imperial units (e.g., $ft^2 \times °F. \times h/Btu$).

By way of comparison, double-pane air-filled units generally have an R-value of about 2. Double-pane gas-filled units and/or units including low-E coatings generally have an R-value of about 3-4. A typical commercially available standalone VIG unit has an R-value of about 7, and recent improvements to conventional VIG units suggest that it may be possible to achieve R-values up to about 10 at the center of the lite.

Unlike these conventional products, certain example embodiments have R-values of at least about 10. In fact, the R-values of certain example embodiments are within the range of about R-11 to R-20, or even higher, at the center of the lite. Example implementations of the embodiments described herein typically have produced within the range of about R-15 to R-16 at the center of the lite.

The R-values of certain example embodiments can be influenced yet further. For example, a low-E coating may be provided on one or more of the six coatable surfaces of the product (e.g., one or more of the outer surface of the outer substrate 202, the inner surface of the outer substrate 202, the outer surface of the VIG unit substrate 104, the outer surface of the VIG unit substrate 102, the inner surface of the substrate 204, and the outer surface of the substrate 204). Moreover, a warm edge spacer system may help reduce heat transfer across the VIG unit edge seal (e.g., the frit or soldered end portion 108). Still further, certain example embodiments may employ the higher insulation (e.g., lower thermal conductivity) properties by filling the outer gaps 210a and 210b with a gas, e.g., of argon, krypton, xenon, or the like. Thus, the gaps may be "gas-filled" in the sense that they are at least partially filled with a gas other than, or in addition to, air.

It will be appreciated that the assembled units of certain example embodiments may be installed as glazed in window or in sash glazing cavities using conventional glazing seals or sealants, methods, and components. Thus, at least in terms of installation techniques, there may be little to no difference between the example embodiments described herein and conventional IG or VIG units.

Also, it will be appreciated that the assembled units of certain example embodiments may employ other coatings on one or more of the coatable substrate surfaces, such as, for example, UV blocking coatings, self-cleaning coatings, etc.

The inclusion of the outer panes 202 and 204 around the embedded VIG unit will affect the visible transmission of the entire assembled unit. Thus, in certain example implementations, it may be necessary to carefully select the VIG glass substrates 102 and 104, and/or the outer substrates 202 and 204 so as to ensure an appropriate visible transmission of the assembled unit. For example, in example implementations where it is desirable to maintain a high visible transmission, it may be advantageous to select glass substrates that have higher visible transmissions. This example situation can be contrasted with example implementations where the transmissivity of the assembled unit is not as important, and thus where the selection of the glass substrates may proceed in a manner less dependent on the visible transmission characteristics thereof. In certain example embodiments, the substrates may be chosen and/or arranged so as to mimic the visible transmission characteristics of conventional IG and/or VIG units. In general, the window unit should have a visible transmission of at least about 50%.

As used herein, the terms "peripheral" and "edge" (e.g., in the context of seals, spacers, etc.) do not mean that the respective components are located at the absolute periphery or edge of the unit, but instead mean that the respective components are at least partially located at or near (e.g., within about two inches) an edge of at least one substrate of the unit.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A window unit, comprising:
    at least first, second, third and fourth substantially parallel spaced-apart glass substrates arranged in this order so as to form a center gap between the second and third, or two inner, substrates and first and second outer gaps respectively between each of the two inner substrates and the two outer substrates;
    one or more spacer elements provided to maintain the first, second, third and fourth substrates in substantially parallel-apart relation to one another;
    a sealant provided proximate a periphery of the window unit so as to at least partially seal the window unit,
    wherein the center gap between the two inner substrates is provided at an inner gap pressure, the inner gap pressure being a pressure less than atmospheric pressure,
    wherein the first and second outer gaps are provided at pressure(s) greater than the inner gap pressure,
    wherein the window unit has an R-value of at least about 11 measured at a center thereof, and
    wherein the sealant extends between the first and fourth glass substrates so that the second and third glass substrates are interior of the sealant.

2. The window unit of claim 1, further comprising a low-E coating provided on one or more of the substrates.

3. The window unit of claim 1, wherein the outer gaps are argon, krypton, and/or xenon inclusive gas-filled gaps.

4. The window unit of claim 1, wherein the sealant is a structural sealant.

5. The window unit of claim 1, wherein the sealant is a polysulfide based sealant, a one- or two-part silicone based sealant, a polyurethane based sealant, a dual seal equivalent sealant product, and/or a hot melt butyl based sealant product.

6. The window unit of claim 1, wherein the spacer element(s) is a butyl-based spacer element, a foam-based spacer element, and/or a warm-edge spacer element.

7. The window unit of claim 1, wherein the spacer element(s) is substantially U-shaped so as to at least partially cradle the two inner substrates between upward extending arms of the substantially U-shaped spacer element, the two outer substrates being on opposing sides of the upward extending arms of the substantially U-shaped spacer element from the two inner substrates.

8. The window unit of claim 7, further comprising an adhesive to adhere the substantially U-shaped spacer element to one or both of the two inner substrates, and/or one or both of the two outer substrates, via the upward extending arms thereof.

9. The window unit of claim 1, wherein at least two pillar-shaped spacer elements respectively provided between each inner substrate and the adjacent outer substrate substantially maintain the four substrates in substantially parallel-apart relation to one another.

10. The window unit of claim 9, further comprising an adhesive to adhere the pillar-shaped spacer elements to one or both of the two inner substrates, and/or one or both of the two outer substrates.

11. The window unit of claim 1, wherein the window unit has an R-value of between about 11 and 20 measured at a center thereof.

12. The window unit of claim 1, wherein the window unit has an R-value of from about 15-16 measured at a center thereof.

13. A window unit, comprising:
    a vacuum insulating glass unit;
    first and second glass substrates located on opposing sides of the vacuum insulating glass unit so as to form first and second outer gaps between the first substrate and the vacuum insulating glass unit and between the vacuum insulating glass unit and the second substrate, respectively;
    at least one spacer element provided proximate to each end of the vacuum insulating glass unit so as to maintain the first and second glass substrates and the vacuum insulating glass unit in substantially parallel-apart relation to one another; and
    a sealant provided at least adjacent to the at least one spacer element at each end of the major axis of the vacuum insulating glass unit so as to at least partially seal the window unit,
    wherein the vacuum insulating glass unit includes an inner air gap at an inner gap pressure, the inner gap pressure being a pressure below atmospheric,
    wherein the first and second outer gaps are provided at pressure(s) greater than the inner gap pressure,
    wherein the window unit has an R-value of at least about 11 measured at a center thereof, and wherein the sealant extends between the first and second glass substrates so that the vacuum insulating glass unit is interior of the sealant.

14. The window unit of claim 13, further comprising a low-E coating provided on the first substrate, the second substrate, and/or the vacuum insulating glass unit.

15. The window unit of claim 13, wherein the outer gaps are argon, krypton, and/or xenon inclusive gas-filled gaps.

16. The window unit of claim 13, wherein the sealant is a polysulfide based sealant, a one- or two-part silicone based sealant, a polyurethane based sealant, a dual seal equivalent sealant product, and/or a hot melt butyl based sealant product.

17. The window unit of claim 13, wherein the at least one spacer element is a butyl-based spacer element, a foam-based spacer element, and/or a warm-edge spacer element.

18. The window unit of claim 13, wherein the at least one spacer element is substantially U-shaped so as to at least partially cradle the vacuum insulating glass unit between upward extending arms of the substantially U-shaped spacer element, the two substrates being on opposing sides of the upward extending arms of the substantially U-shaped spacer element from the vacuum insulating glass unit.

19. The window unit of claim 18, further comprising an adhesive to adhere the substantially U-shaped spacer element to the vacuum insulating glass unit and/or one or both of the two substrates, via the upward extending arms thereof.

20. The window unit of claim 13, further comprising two pillar-shaped spacer elements respectively provided between vacuum insulating glass unit and the adjacent outer substrate proximate to each end of the major axis of the window unit so as to maintain the vacuum insulating glass unit and the two substrates in substantially parallel-apart relation to one another.

21. The window unit of claim 20, further comprising an adhesive to adhere the pillar-shaped spacer elements to vacuum insulating glass unit, and/or one or both of the two substrates.

22. The window unit of claim 13, wherein the window unit has an R-value of about 15-16 measured at a center thereof.

* * * * *